(12) United States Patent
Florian

(10) Patent No.: US 8,281,471 B2
(45) Date of Patent: Oct. 9, 2012

(54) CEILING RADIATION DAMPER FUSIBLE LINK TOOL

(75) Inventor: Michael J. Florian, Eighty-Four, PA (US)

(73) Assignee: Aire Technologies, Inc., Monongahela, PA (US)

( * ) Notice: Subject to any disclaimer, the term of this patent is extended or adjusted under 35 U.S.C. 154(b) by 353 days.

(21) Appl. No.: 12/397,611

(22) Filed: Mar. 4, 2009

(65) Prior Publication Data
US 2010/0223773 A1 Sep. 9, 2010

(51) Int. Cl.
*B25B 27/14* (2006.01)
(52) U.S. Cl. ............... 29/283; 29/276; 29/278
(58) Field of Classification Search ............ 29/283, 29/270–278
See application file for complete search history.

(56) References Cited

U.S. PATENT DOCUMENTS

| | | | | | |
|---|---|---|---|---|---|
| 73,331 | A | * | 1/1868 | Holly | 294/23.5 |
| 4,075,750 | A | * | 2/1978 | Collumber | 29/278 |
| D256,442 | S | * | 8/1980 | Martin | D10/77 |
| 5,265,326 | A | * | 11/1993 | Scribner | 29/758 |
| 5,447,289 | A | * | 9/1995 | Callahan | 254/131 |
| 5,495,651 | A | * | 3/1996 | Tsuha | 29/235 |
| 6,409,152 | B1 | * | 6/2002 | Bagley | 254/18 |
| 7,311,293 | B2 | * | 12/2007 | Mrugalski, Jr. | 254/25 |
| 2002/0134971 | A1 | * | 9/2002 | Christensen | 254/25 |
| 2007/0045599 | A1 | * | 3/2007 | Bilyeu et al. | 254/25 |
| 2010/0223773 | A1 | * | 9/2010 | Florian | 29/283 |

* cited by examiner

*Primary Examiner* — Lee D Wilson
(74) *Attorney, Agent, or Firm* — Beck & Thomas, P.C.

(57) ABSTRACT

This invention provides for a ceiling radiation damper fusible link tool and method of inserting a fusible link for a ceiling radiation damper. The fusible link tool has a holder capable of holding a fusible link and a handle connected to the holder so that the holder may be inserted into a ceiling radiation damper by a user.

3 Claims, 3 Drawing Sheets

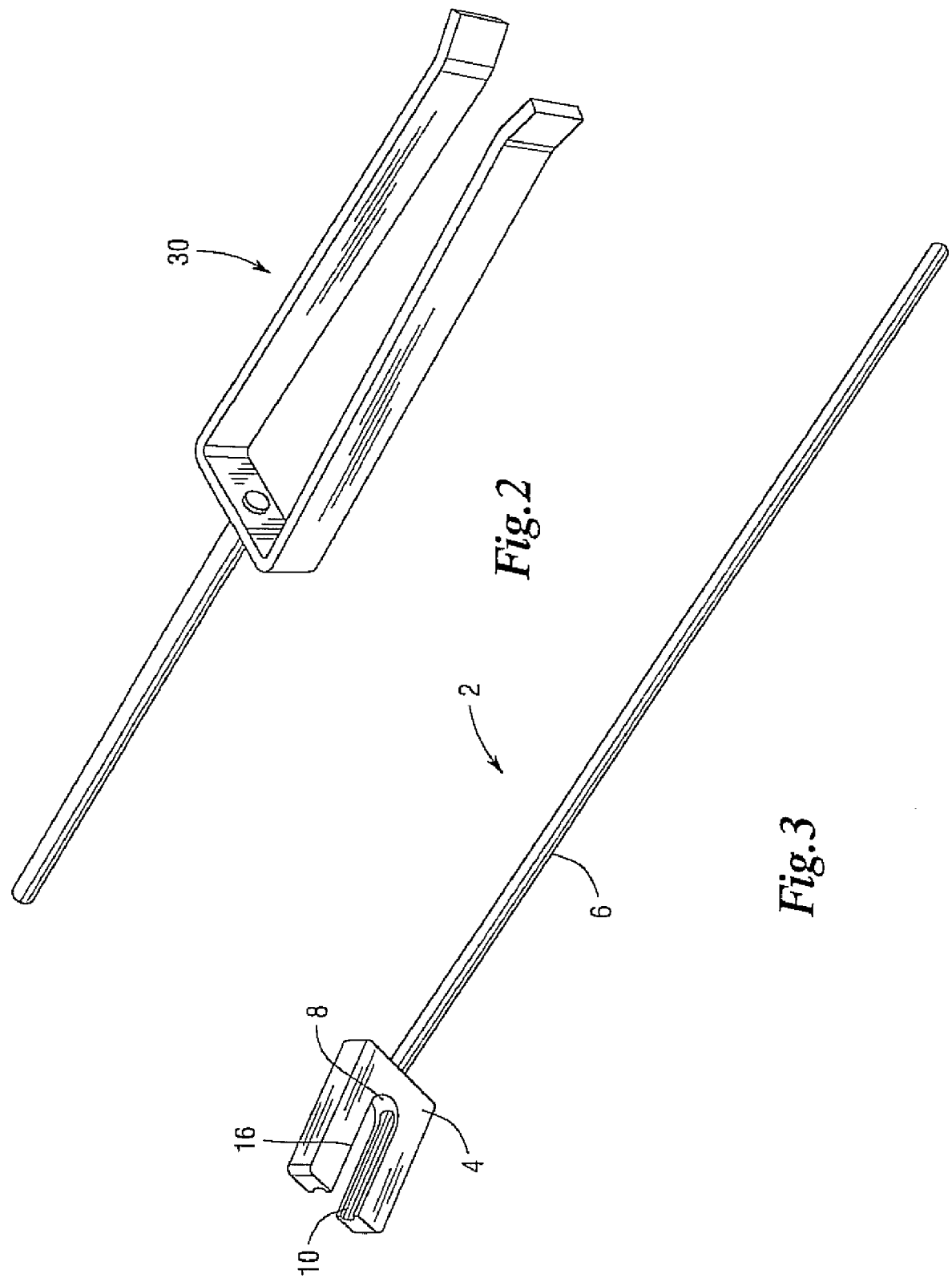

CEILING RADIATION DAMPER FUSIBLE LINK TOOL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION (1) Field of the Invention

The invention relates to a new and novel tool used to improve the method of field-testing and servicing ceiling radiation dampers ("CRDs").

(2) Description of the Related Art

CRDs are human life safety components of an HVAC system used to restrict radiant heat and fire in engineered floor/ceiling and roof/ceiling assemblies where ducts either penetrate or exit the ceiling membrane in that fire resistive assembly.

CRDs typically consist of two spring-loaded blades held open by a bi-metal heat sensitive, fusible link. When exposed to elevated temperatures, the fusible link separates allowing the blades to close off the opening, reestablishing the fire rated barrier.

During inspection of the HVAC system, at the conclusion of construction and prior to issuance of the occupancy permit, it is necessary to remove the fusible link to verify that the blades will close as designed.

After the test, it is difficult to reinstall the fusible link due to the link's orientation within the ceiling radiation damper assembly in the ceiling. The technician must climb a ladder and while working above his head, simultaneously hold the blades open while reinstalling both ends of the fusible link to two small wire hooks and catches that hold the blades open. This procedure is especially difficult with smaller CRDs because there is less space for the technician to insert his hand into the ceiling radiation damper assembly.

The invention is comprised of a holder for the fusible link positioned at the end of a rod. The technician places the fusible link into the holder and then installs the link by manipulating the rod. Because the rod and holder are slender, the technician has a clearer view and better access to afford easier completion of resetting the fusible link.

BRIEF SUMMARY OF THE INVENTION

This invention provides for a ceiling radiation damper fusible link tool having a holder capable of holding a fusible link and a handle connected to the holder so that the holder may be inserted into a ceiling radiation damper by a user. The handle enables the user to insert the holder into the ceiling radiation damper without the user's hand having to enter into the damper. The holder has a u-shaped body, and a channel to hold a fusible link within an inner edge of the u-shaped body.

This invention also provides for a method for installing a fusible link into a ceiling radiation damper. A ceiling radiation damper having a spring-loaded blade is installed in an HVAC system. A fusible link that can be used to hold the spring loaded blade open under normal operating conditions is provided. The spring-loaded blade is manually held open. A ceiling radiation damper fusible link tool is used to insert the fusible link into the ceiling radiation damper so that it keeps the spring loaded blade open.

BRIEF DESCRIPTION OF THE SEVERAL VIEWS OF THE DRAWING

FIG. 2 shows a perspective view of the pronged tool; and

FIG. 3 shows a perspective view of a ceiling radiation damper fusible link tool.

DETAILED DESCRIPTION OF THE INVENTION

Definitions

"ceiling radiation damper fusible link tool"—a device used to assist a person in engaging a fusible link with a spring-loaded blade of a ceiling radiation damper.

"holder capable of holding a fusible link"—any structure capable of retaining a fusible link.

"handle"—a part designed to be grasped by the hand.

"holder may be inserted into a ceiling radiation damper"—placing holder inside of ceiling radiation damper.

"enables the user to insert the holder into the ceiling radiation damper without a user's hand having to enter into the damper"—the user is able to insert the holder with the fusible link into the ceiling radiation damper with the user's hand outside of the ceiling radiation damper. This can be far enough outside so that the user's view is not impaired or blocked by their hand.

"u-shaped body"—structure configured like a "u" having an opening.

"channel to hold a fusible link"—a groove created to hold a fusible link. The width and depth of the groove is sufficient to hold a fusible link so that it can be installed.

"inner edge of the shaped body"—the edge closest to the center, an example can be seen in FIG. 3 reference No. 16.

"ceiling radiation damper"—human life safety components of an HVAC system used to restrict radiant heat and fire in engineered floor/ceiling and roof/ceiling assemblies where ducts either penetrate or exit the ceiling membrane. The ceiling radiation damper can be round, oval, rectangular, or square.

"installed in an HVAC system"—to establish in a heating ventilation air conditioning system.

"a fusible link"—a device that holds a spring-loaded blade open and is heat sensitive so that when it is exposed to elevated temperatures it separates and allows the blade to close off the duct opening.

"under normal operating conditions"—occurs when a typical range of air temperature is circulated through an HVAC system.

"keeps spring-loaded blade open"—maintaining the spring-loaded blade so that ductwork is not restricted.

"at an angle with respect to the holder"—the handle is angled from the holder so that it allows a user to keep their hand out of the line of sight. The angle could be from 1 to 90 degree(s), preferably it is from 5 to 45 degrees and most preferably from 5 to 35 degrees.

"installing a fusible link"—the act of putting the link into a ceiling radiation damper. This will include reinstalling the link if for any reason the link is taken out, such as for inspection purposes.

"pronged tool"—the type of device shown in FIG. 2.

Description

Figure 1:
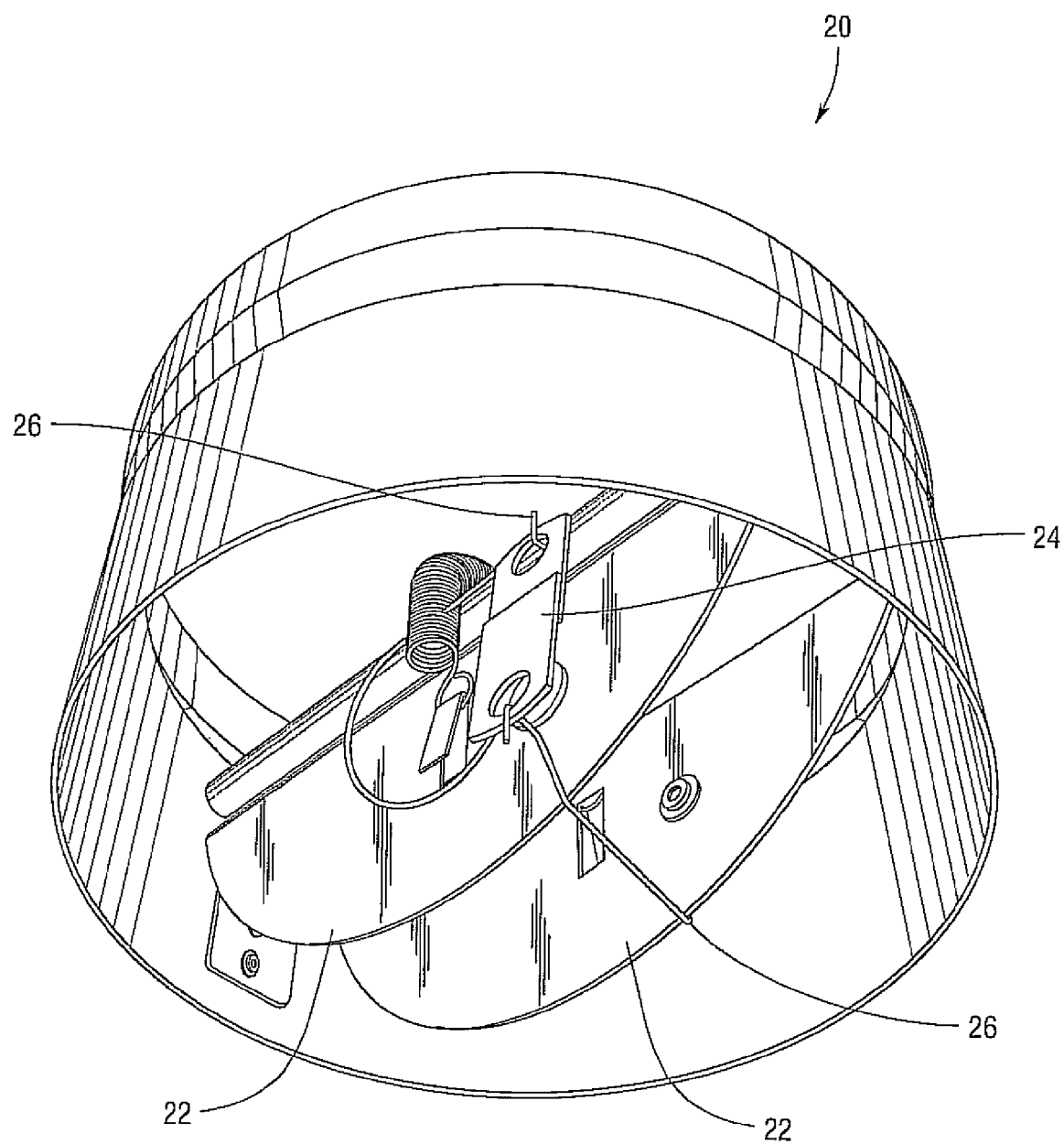
FIG. 1 shows a perspective view of a ceiling radiation damper with a fusible link.

FIG. 1 shows a ceiling radiation damper 20. The ceiling radiation damper 20 has two spring-loaded blades 22 which when closed restrict heal and fire. A fusible link 24 is used to hold open the two spring-loaded blades 22. The fusible link 24 connects on both ends to a holding wire 26. When the fusible link 24 is exposed to heat, the link separates and the spring-loaded blades 22 close.

FIG. 2 shows a pronged tool 30. The pronged tool 30 can be used to hold open spring-loaded blades 22. The pronged tool 30 is inserted into ceiling radiation damper 20 and the prongs hold open the spring-loaded blades 22.

FIG. 3 shows a ceiling radiation damper fusible link tool 2. The ceiling radiation damper fusible link tool 2 has a holder 4 capable of holding a fusible link 24. The ceiling radiation damper fusible link tool 2 has a handle 6. The handle 6 can be set at an angle from the holder 4. This angle can be fixed or it can be adjustably hinged. Preferably the holder 4 has a u-shape S. The u-shape 8 has an inner edge 16. Around the inner edge 16 the u-shape 8 has a channel 10.

Figure 4:
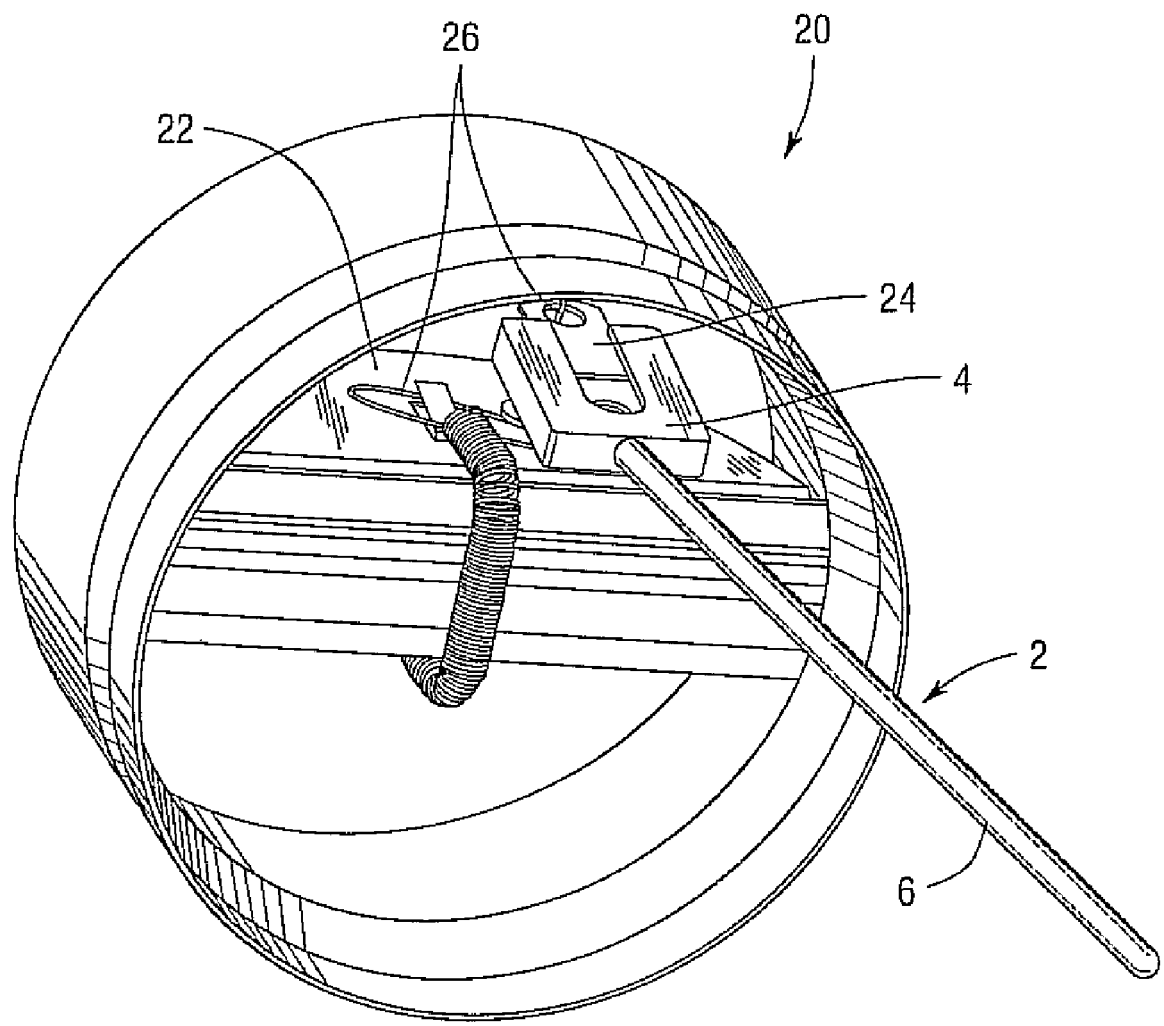
FIG. 4 shows a perspective view of a round ceiling radiation damper with the ceiling radiation damper fusible link tool.

During the inspection process all fusible links 24 are removed. After the inspection, it becomes necessary to replace the fusible link 24. This is often difficult. The ceiling radiation damper fusible link tool 2 significantly aids in the process of replacing the fusible link 24. The user places the fusible link 24 into the channel 10 in the u-shape 8 portion of the ceiling radiation damper fusible link tool 2. The user then grabs the handle 6 and uses the handle 6 to link the fusible link 24 with both ends of the holding wire 26. The handle 6 makes it easier for the user to manipulate and maneuver the fusible link 24 when it is inside of the ceiling radiation damper 20. FIG. 4 shows the ceiling radiation damper fusible link tool 2 inserting the fusible link 24.

Various changes could be made in the above construction and method without departing from the scope of the invention as defined in the claims below. It is intended that all matter contained in the above description, as shown in the accompanying drawings, shall be interpreted as illustrative and not as a limitation.

I claim:

1. A ceiling radiation damper fusible link tool comprising:
   (a) a holder having a u-shaped body with the upper and lower surface of the u-shaped body being parallel to each other throughout the full extent of the holder, the holder being capable of holding a fusible link;
   (b) a handle connected to the holder so that the holder may be inserted into a ceiling radiation damper and manipulated therein by a user with one hand and the handle enables the user to insert the holder into the ceiling radiation damper without a user's hand having to enter into the ceiling radiation damper; and
   (c) a channel comprising the interior of the legs of the u-shaped body having a plurality of grooves formed therein parallel to the upper and lower surfaces to facilitate holding the fusible link within the interior space between the legs of the u-shaped body.

2. A ceiling radiation damper fusible link tool as recited in claim 1 wherein the handle is disposed at an angle with respect to the holder.

3. A ceiling radiation damper fusible link tool comprising:
   (a) a holder having a u-shaped body with the upper and lower surfaces of the u-shaped body being parallel to each other throughout the full extent of the holder;
   (b) the legs of the u-shaped body extending so that their interior surfaces are parallel to each other with grooves formed in the interior surfaces of the legs with the grooves being parallel to the upper and lower surfaces of the u-shaped body;
   (c) the interior surfaces of the legs of the u-shaped body being slightly concave to more readily accept and hold the fusible link in a position parallel to the upper and lower surfaces of the u-shaped body;
   (d) a handle fixed to the holder and extending at an angle to the parallel upper and lower surfaces to the holder so that the holder may be easily inserted into the ceiling radiation damper and manipulated by the user with one hand to permit the user to position the fusible link in place within the ceiling radiation damper; and
   (e) the angle formed between the holder and the handle being between 5° and 35°.

* * * * *